(12) United States Patent
Burke (10) Patent No.: US 11,699,163 B2
(45) Date of Patent: Jul. 11, 2023

(54) REAL-TIME INTEGRATION OF ANALYTICS FOR ONLINE SERVICES

(71) Applicant: NCR Corporation, Atlanta, GA (US)

(72) Inventor: Taylor Dixon Burke, Atlanta, GA (US)

(73) Assignee: NCR Corporation, Atlanta, GA (US)

(*) Notice: Subject to any disclaimer, the term of this patent is extended or adjusted under 35 U.S.C. 154(b) by 442 days.

(21) Appl. No.: 16/045,976

(22) Filed: Jul. 26, 2018

(65) Prior Publication Data
US 2020/0034856 A1 Jan. 30, 2020

(51) Int. Cl.
*G06Q 30/0201* (2023.01)

(52) U.S. Cl.
CPC ............................ *G06Q 30/0201* (2013.01)

(58) Field of Classification Search
CPC .................................................. G06Q 30/0201
USPC ....................................................... 705/7.29
See application file for complete search history.

(56) References Cited

U.S. PATENT DOCUMENTS

| | | | | |
|---|---|---|---|---|
| 7,124,101 B1* | 10/2006 | Mikurak | ................ | G06Q 10/06 705/35 |
| 7,552,069 B2* | 6/2009 | Kepecs | .............. | G06Q 30/0238 705/14.25 |
| 9,195,959 B1* | 11/2015 | Lopez | .................. | G06Q 10/087 |
| 10,133,995 B1* | 11/2018 | Reiss | ..................... | G06Q 50/12 |
| 10,321,263 B1* | 6/2019 | Alkarmi et al. | .... | G06Q 30/0601 |
| 10,366,436 B1* | 7/2019 | Kumar | ................ | G06Q 10/087 |
| 10,410,243 B2* | 9/2019 | Boal | .................... | G06Q 20/209 |
| 11,010,739 B2* | 5/2021 | Bell | ....................... | G06Q 20/20 |
| 11,164,172 B2* | 11/2021 | Bell | ...................... | G06Q 20/202 |
| 11,403,665 B2* | 8/2022 | Boal | ................... | G06Q 30/0255 |
| 2004/0064351 A1* | 4/2004 | Mikurak | .............. | G06Q 10/087 705/22 |
| 2009/0132366 A1* | 5/2009 | Lam | .................... | G06F 16/9535 705/14.36 |
| 2011/0093361 A1* | 4/2011 | Morales | ............. | G06Q 30/0603 705/26.62 |
| 2014/0180793 A1* | 6/2014 | Boal | .................. | G06Q 30/0251 705/14.66 |
| 2014/0180811 A1* | 6/2014 | Boal | .................... | G06Q 20/209 705/14.53 |
| 2014/0297362 A1* | 10/2014 | Kumar | ............... | G06Q 30/0613 705/7.29 |
| 2014/0379428 A1* | 12/2014 | Phansalkar | ............. | H04L 67/22 705/7.32 |
| 2015/0170175 A1* | 6/2015 | Zhang | ................... | H04M 15/44 705/7.33 |
| 2018/0218392 A1* | 8/2018 | Slain | .................. | G06Q 30/0277 |
| 2018/0300800 A1* | 10/2018 | Rajkhowa | .......... | G06Q 30/0635 |
| 2019/0075128 A1* | 3/2019 | Roosenraad | ........ | H04L 63/1425 |

(Continued)

FOREIGN PATENT DOCUMENTS

| | | | | |
|---|---|---|---|---|
| WO | WO-0139029 A2 * | 5/2001 | ............. | H04L 43/00 |
| WO | WO-2013188815 A2 * | 12/2013 | ........... | G06F 16/958 |

(Continued)

*Primary Examiner* — Dylan C White
(74) *Attorney, Agent, or Firm* — Schwegman Lundberg & Woessner, P.A.

(57) ABSTRACT

A provider-based platform analytics engine provides real-time analytics to online services for providers. The analytics are integrated into customer-facing interfaces of the online services for providing meaningful real-time information and recommendations to consumers during customer order processing.

19 Claims, 4 Drawing Sheets

(56) References Cited

U.S. PATENT DOCUMENTS

| | | | |
|---|---|---|---|
| 2019/0205856 A1* | 7/2019 | Bell | G06Q 20/14 |
| 2019/0205857 A1* | 7/2019 | Bell | G06Q 20/202 |
| 2020/0005347 A1* | 1/2020 | Boal | G06Q 30/0211 |
| 2020/0034856 A1* | 1/2020 | Burke | G06Q 30/0201 |
| 2020/0264467 A1* | 8/2020 | Huang | G02F 1/1368 |
| 2021/0264467 A1* | 8/2021 | Boal | G06Q 30/0211 |
| 2021/0312413 A1* | 10/2021 | Bell | G06Q 20/14 |
| 2022/0051181 A1* | 2/2022 | Yacoub | G06Q 10/06 |
| 2022/0164757 A1* | 5/2022 | Des Ligneris | G06Q 10/06312 |

FOREIGN PATENT DOCUMENTS

| | | | | |
|---|---|---|---|---|
| WO | WO-2015051177 A1 * | 4/2015 | | G06Q 50/01 |
| WO | WO-2019133279 A1 * | 7/2019 | | G06Q 50/12 |

\* cited by examiner

REAL-TIME INTEGRATION OF ANALYTICS FOR ONLINE SERVICES

BACKGROUND

Many online and mobile-based services are available in the industry to provide services to consumers. Retailers may include their own online infrastructure for providing services directly to their customers through mobile services. However, some online services act as a middleware between consumers and retailers. For example, a variety of middleware online services have recently become popular with consumers, such as Uber Eats™, Postmates™, Grub Hub™, Door Dash™, and others.

Rather than, these middleware services having to directly interface with each of the available retail providers, the middleware service may rely on a third-party service that provides an interface from the middleware services to a plurality of retail providers. One such third-party online service is the Omni-Channel Decision Support Platform (ODSP™), distributed by NCR®, Inc.

The third-party service facilitates integration between the middleware services and participating retail providers available to consumers through mobile applications (apps) interfaced to the middleware services.

However, existing third-party services provide very little real-time and intelligent information about the retail providers to the middleware services, and what is provided is information with respect to a particular provider (selected by an ordering consumer) and not with respect to all available providers. Furthermore, the information for a particular provider does not provide enough detail, such that the ordering consumer can make an intelligent decision as to whether an order should be placed with a given retail provider or placed with a different available retail provider.

Accordingly, there is a need to provide integration of real-time analytics regarding retail providers to middleware online services when ordering consumers are attempting to place orders with those middleware online services.

Summary

In various embodiments, methods and a system for real-time integration of analytics for online services are presented.

According to an embodiment, a method for real-time integration of analytics for online services is presented. Specifically, and in one embodiment, metrics from a plurality of providers and a data store are obtained. Analytics are produced from the metrics and the analytics are delivered to an online service for integration into an order process that a consumer is engaged in with the online service.

DETAILED DESCRIPTION

Figure 1:
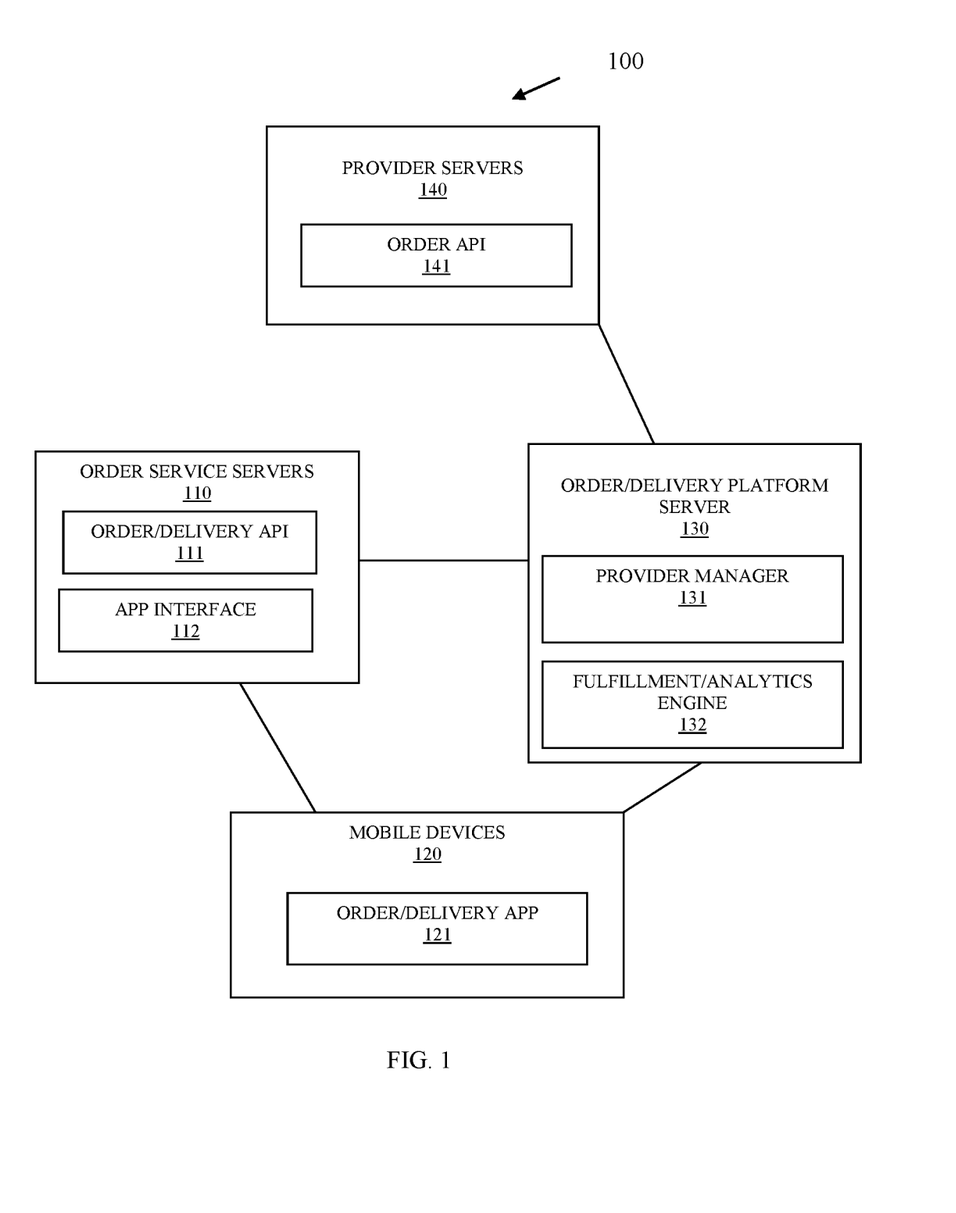
FIG. 1 is a diagram of a system for real-time integration of analytics for online services, according to an example embodiment.

FIG. 1 is a diagram of a system 100 for real-time integration of analytics for online services, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time integration of analytics for online services, presented herein and below.

The system 100 includes a plurality of online order service servers 110, each executing a consumer-facing application (app) interface 112 and a novel order/delivery Application Programming Interface (API) 111. Moreover, the system 100 includes a plurality of consumer-operated mobile devices 120 each executing at least one order/deliver mobile application (app) 121. Further, the system 100 includes a novel order/delivery platform server 130 executing a provider manager 131 and fulfillment/analytics engine 132. Finally, the system includes a plurality of provider services 140, each executing an order API 141.

During operation of the system 100, a consumer interacts with the order/delivery app 121 on the consumer's device 120 for purposes of placing an order or attempting to place an order for a good or service being provided by a provider associated with one of the provider servers 140. The order/delivery app 121 establishes a network connection with the app interface 112 for an online order service associated with an order service servers 110. The app 121 and app interface 112 provides a variety of features and options to the consumer, defined and maintained by the online order service.

The order placement and/or payment for any placed order can be handled through the platform server 130 through the provider manager 131 and interaction with a particular provider's order API 141.

Once the consumer has selected a particular type of retail provider or a particular type of food that the consumer is interested in through the interaction between the app 121 and the app interface 112, the particular type and other details regarding the consumer's order are communicated from the order/delivery API 111 to the fulfillment/analytics engine 132.

The engine 132 may be continuously and in real-time processing the provider manager 131 to gather useful metrics from each of the provider services. This processing occurs before the consumer's actual order. The metrics may include such things as, and for each provider retail location: current wait times for fulfilling new orders, size of the current unfulfilled order queue, items being ordered including side items (such as: salads, pizza toppings, appetizers, desserts, etc.), origination source of each order (such as: received through an online order service, direct call from consumers, received from provider's online service, etc.), time each order within a last configured period of time was placed, time each order within the last configured of time was fulfilled, and other metrics.

The platform server 130 includes a database for the gathered metrics from the provider servers 140. The database metrics are organized and maintained at least for: 1) each provider type (such as: American, Italian, Mexican, Chinese, French, Indian, steak, fast food, sea food, etc.), 2) each retail provider for each provider type (such as: McDonalds®, Panera®, Olive Garden®, etc.), and 3) each provider location for each provider (such as: McDonalds located on street X in city Y (geographical location for each retail provider outlet), etc.).

The engine 132 provides analytics from the gathered metrics through searching the database in real time to obtain and processing the returned metrics to provide analytics that can be provided in real time to the order/delivery API 111. Such analytics may at least include: 1) the average fulfillment time at provider locations (within a given geographical range) for multiple different providers of a same provider type, 2) most popular ordered items from a particular provider type, a particular provider, and/or a particular provider at a particular provider's location (determined over a given period of time), 3) most popular ordered side items from a particular provider type, a particular provider, and/or a particular provider at a particular provider's location (determined over a given period of time), 4) most popular other items ordered for a given ordered item from a particular provider type, a particular provider, and/or a particular provider at a particular provider's location (determined over a given period of time), and/or 5) most popular items ordered on a given calendar date or day of week from a particular provider type, a particular provider, and/or a particular provider at a particular provider's location (based on the given calendar date or day of week—this can identify promotions from providers that are recurring and/or identify provider items that are only available for ordering on certain calendar days or days of the week).

In an embodiment, the provider manager 131 may also interact with the order API 141 to obtain or receive current promotions being offered by a provider. For example, on Tuesday during June there is a free appetizer for any meal ordered. The engine 132 can record such promotions in the database, such that the current available promotions for a particular provider or a particular provider's location can be provided by the engine 132 in real time to the order/delivery API 111.

The engine 132 delivers the analytics in real time to the order/delivery API 111. The online order service can then integrate the analytics through the app interface 112 to provide the consumer through the app 121 with recommendations or informed information regarding an order or potential order of the consumer.

For example, consider the following scenario. A consumer accesses an Uber Eats® mobile app 121 and orders a pizza. The pizza order is communicated through the order/delivery API 111 to the engine 132. The engine 132 uses the provider manager 131 for interacting with order APIs 141 from Papa John's® and Domino's® (two pizza providers within a given geographical range of the consumer's current location (obtained by the app interface 112 with the order from the app 121, which uses location services on the device 120)) to obtain current metrics with respect to current timeliness of both pizza providers. The engine 132 may also search the database maintained on the platform server 130 to obtain current and real-time timeliness for pizza providers (such as average response times from the pizza providers over the last 30 minutes and 1 hour respectively, average response times for the pizza providers for the day of the week and time associated with the order, etc.). The engine 132 returns the various time averages or a single time average for each pizza provider back to the order delivery API 111. The online order service may then select the faster of the two pizza providers to service a pizza order from the consumer and suggest to the consumer to use that one since it is more timely and/order the time averages for both pizza providers are provided for the consumer to make his/her own decision. The consumer can now make an intelligent decision as to whether the consumer wants to select one or the other pizza provider based on the current average time for fulfillment of the order by the two pizza providers.

In another scenario, consider a consumer orders a pizza from Uber Eats® using the app 121 and performs the interactions as discussed above in the previous scenario. The engine 132 searches the database for recent pizza order metrics when ordering pizza (based on location, based on particular pizza providers) and the metrics are processed to generated analytic information representing the top side items that consumers also order for a given period of time (last week, last 2 hours, on Fridays over the last month, etc.). The analytic information (top side items) is then returned back to the order/delivery API 111 as a list and the app interface 112 makes suggestions to the consumer to order one or more of the side items from the list within the app 121.

In still other scenarios, the app interfaces 112 of online order services can process the analytics provided by the engine 132 to deliver specific useful recommendations to consumers during the ordering process through the customer-facing interface of their apps 121. For example, "people at this Chick-Fil-A® typically like ordering a small ice cream, would you like to add this to your order?" As another example, "if you order from this Papa John's®, your delivery time will be 15 minutes quicker right now." In fact, a variety of useful recommendations can be provided to the consumers during the ordering process with the analytics provided by the engine 132; as such, the invention is not intended to be restricted to just the above-illustrated scenarios.

In an embodiment, the order/delivery API 111 and the engine 132 can continuously interact with one another in advance of any particular consumer order, such that the app interface 112 is pre-populated with analytics regarding particular provider types, particular providers, particular provider locations, particular items that may be ordered, and various combinations of these things. This continuous interaction can be refreshed at configurable intervals of time (such as every 30 minutes to an hour). In this way, the timeliness of responding to particular consumer orders with analytics can be improved. Such interaction can be configured for particular analytics of interest to the online services based on each online services knowledge of their customers.

In an embodiment, the device 120 is one of: a phone, a tablet, a wearable processing device, a laptop, a voice-enabled network device (Google Home®, Amazon Echo®, Apple Siri®, etc.), and a desktop computer.

In an embodiment, the servers 110, 130, and/or 140 are organized as a collection of cooperating servers that operate as a single server in a cloud processing environment.

In an embodiment, the platform server 130 is subsumed within a particular provider server 140 or the platform server 130 is subsumed within a particular order service server 110.

In an embodiment, the platform server 130 is an enhanced version of ODSP®, distributed by NCR®, Inc. and enhanced with the engine 132 to provide the integration of analytics with online order services.

These and other embodiments are now discussed with reference to the FIGS. 2-4.

Figure 2:
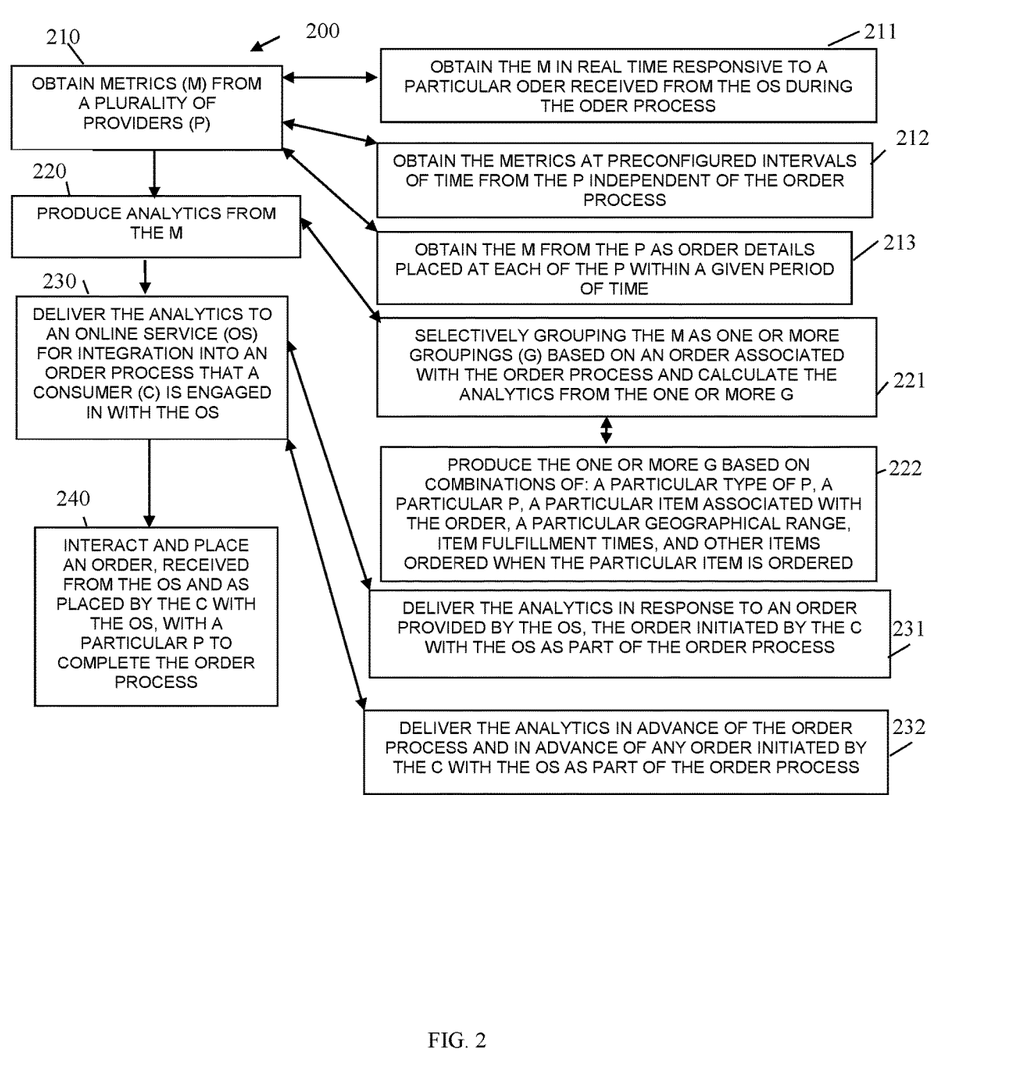
FIG. 2 is a diagram of a method for real-time integration of analytics for online services, according to an example embodiment.

FIG. 2 is a diagram of a method 200 for real-time integration of analytics for online services, according to an example embodiment. The software module(s) that implements the method 200 is referred to as an "analytics engine." The analytics engine is implemented as executable instructions programmed and residing within memory and/or a non-transitory computer-readable (processor-readable) storage medium and executed by one or more processors of a device. The processor(s) of the device that executes the analytics engine are specifically configured and programmed to process the analytics engine. The analytics engine has access to one or more network connections during its processing. The network connections can be wired, wireless, or a combination of wired and wireless.

In an embodiment, the device that executes the analytics engine is the platform server 130. In an embodiment, the server 130 is a cloud processing environment that comprises multiple servers cooperating with one another as a single server.

In an embodiment, the analytics engine is the all or some combination of the provider manager 131 and/or the engine 132.

At 210, the analytics engine obtains metrics from a plurality of retail providers. In an embodiment, the retail providers are associated with particular food service retailers and provide interaction through the order API 141 for providing the metrics and taking online orders from the provider manager 131. The provider manager 131 is associated with the same platform server 130 as the analytics engine 132 (the analytics engine is the analytics engine 132). This provides for automated and dynamic network-based interaction between the analytics engine and each of the providers.

In an embodiment, at 211, the analytics engine obtains the metrics in real time responsive to a particular order received from the online service during the order process. In an embodiment, the online service is the online order and delivery server 110 that interacts with a consumer through the app interface 112 and interacts with the analytics engine through the order/delivery API 111.

In an embodiment, at 212, the analytics engine obtains the metrics at preconfigured intervals of time from the providers independent of the order process. That is, the analytics engine may obtain and house ordering metrics from the providers at preconfigured intervals of time (such as every thirty minutes) and house those metrics in a database accessible from the platform server 130 that executes the analytics engine, such that the analytics engine has the metrics in advance of a request for a particular order received from the online order and delivery service.

In an embodiment, at 213, the analytics engine obtains the metrics from the providers as order details associated with orders that have been placed at each of the providers within a given period of time.

At 220, the analytics engine produces analytics from the metrics obtained at 210. The analytics are generated/calculated from the metrics.

In an embodiment, at 221, the analytics engine selectively groups the metrics as one or more groupings based on an order associated with the order process. The analytics engine calculates the analytics from the one or more groupings. Such calculations can be made on the metrics of the groupings to produce analytics that include: an average current fulfillment time at each of the producer locations for the producers for orders being placed, most popular side items at the producer locations when an item being ordered during the order process was ordered, and others as was discussed above with the system 100 of the FIG. 1.

In an embodiment of 221 and at 222, the analytics engine produces the one or more groupings as combinations of the metrics gathered for: a particular type of produce (as discussed above with the FIG. 1), a particular produce at a particular producer location (as discussed above with the FIG. 1), a particular item associated with the order (as discussed above with the FIG. 1), a particular geographical range (as discussed above with the FIG. 1), item fulfillment times (as discussed above with the FIG. 1), and other items ordered with the particular item is ordered (as discussed above with the FIG. 1).

At 230, the analytics engine delivers the analytics to an online order and delivery service for integration into an order process that the consumer is engaged in with the online service. Integration can include the online service processing the analytics to provide a real-time recommendation to the consumer during the order process.

In an embodiment, at 231, the analytics engine delivers the analytics in response to an order provided by the online service. The order is initiated by the consumer with the online service as part of the order process.

In an embodiment, at 232, the analytics engine delivers the analytics in advance of any actual order initiated by the consumer with the online service as part of the order process. This was discussed above with the discussion of the FIG. 1 and can improve processing responsiveness between the online service and the consumer operated device 120 by essentially caching the analytics at the online service server 110 associated with the app interface 112 of the online service, such that the analytics are immediately available for the online service to process and make recommendations to the consumers.

According to an embodiment, at 240, the analytics engine interacts and places an order received from the online service, received from the online service and as placed by the consumer, with a particular provider to complete the order process.

Figure 3:
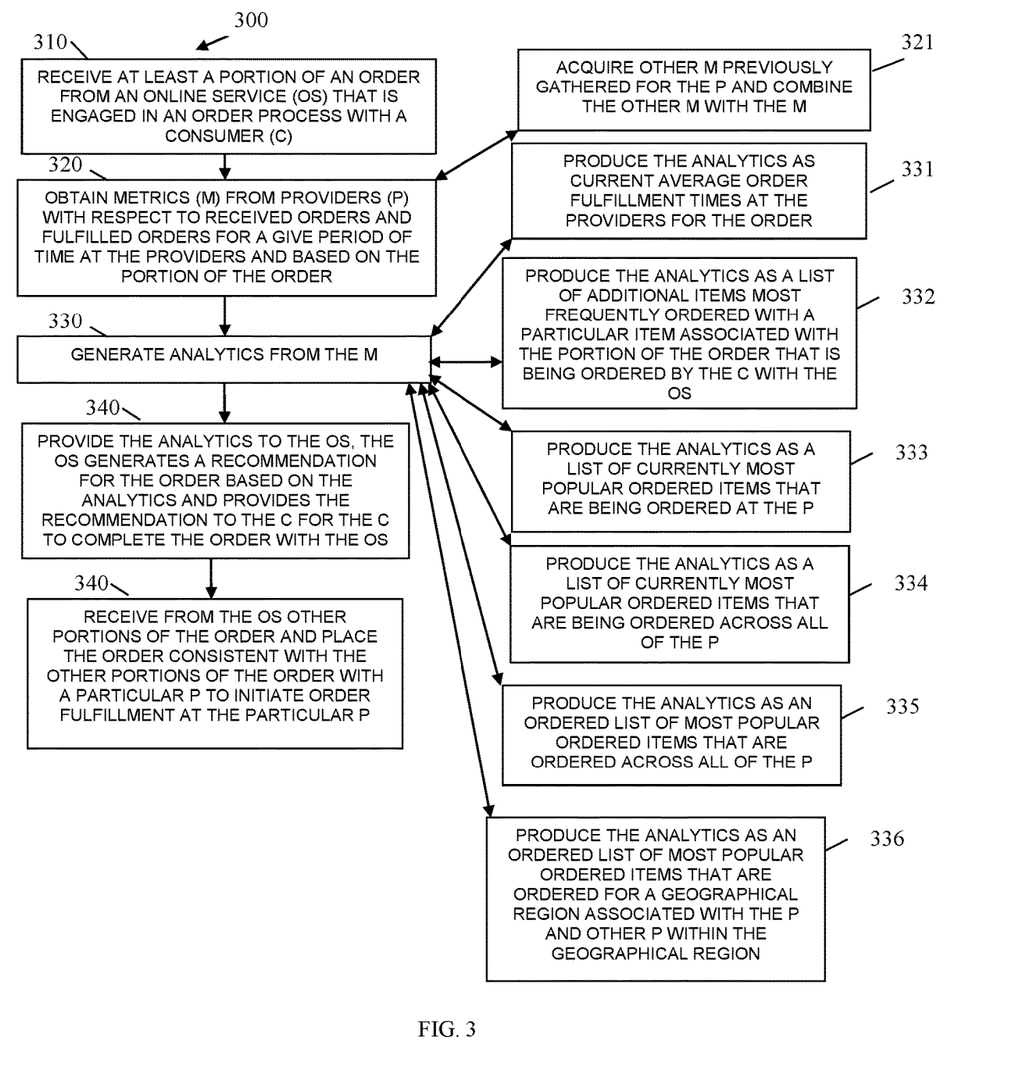
FIG. 3 is a diagram of another method for real-time integration of analytics for online services, according to an example embodiment.

FIG. 3 is a diagram of another method 300 for real-time integration of analytics for online services, according to an example embodiment. The software module(s) that implements the method 300 is referred to as a "fulfillment/analytics manager." The fulfillment/analytics manager is implemented as executable instructions programmed and residing within memory and/or a non-transitory computer-readable (processor-readable) storage medium and executed by one or more processors of a device. The processors that execute the fulfillment/analytics manager are specifically configured and programmed to process the fulfillment/analytics manager. The fulfillment/analytics manager has access to one or more network connections during its processing. The network connections can be wired, wireless, or a combination of wired and wireless.

In an embodiment, the device that executes the fulfillment/analytics manager is the platform server 130. In an embodiment, the server 130 is a cloud processing environment that comprises multiple servers cooperating with one another as a single server.

In an embodiment, the fulfillment/analytics manager is all or some combination of the provider manager 131, the engine 132, and/or the method 200.

The fulfillment/analytics manager presents another and in some ways enhanced processing perspective to that which was described above with the FIG. 2.

At 310, the fulfillment/analytics manager receives at least a portion of an order from an online order and delivery service that is engaged in an order process with a consumer. In an embodiment, the online service is the processing (111 and 112) associated with the online service server 110.

At 320, the fulfillment/analytics manager obtains metrics from providers with respect to received orders and fulfilled orders for a given period of time that are occurring at the providers based on the portion of the order received at 310.

In an embodiment, at 321, the fulfillment/analytics manager acquires other metrics for the producers and combines the other metrics with the metrics. That is, the fulfillment/analytics manager may be continually requesting and gathering metrics for orders being placed at the producers and housing such other metrics in a database (as was discussed above with the FIG. 1). In this manner, the fulfillment/analytics manager may have a history of order metrics for each of the producers available to combine with the real-time metrics for processing.

At 330, the fulfillment/analytics manager generates analytics from the metrics. This can be any of the analytics discussed above with the FIGS. 1 and 2.

In an embodiment, at 331, the fulfillment/analytics manager produces the analytics as current average order fulfillment times at the providers for the order.

In an embodiment, at 332, the fulfillment/analytics manager produces the analytics as a list of additional items most frequently ordered with a particular item associated with the portion of the order that is being ordered during the order process.

In an embodiment, at 333, the fulfillment/analytics manager produces the analytics as a list of currently most popular ordered items that are being ordered at the providers.

In an embodiment, at 334, the fulfillment/analytics manager produces the analytics as a list of currently most popular ordered items that are being ordered at the providers.

In an embodiment, at 335, the fulfillment/analytics manager as an ordered list of most popular ordered items that are being ordered across all of the providers as a whole.

In an embodiment, at 336, the fulfillment/analytics manager produces the analytics as an ordered list of most popular ordered items are ordered for a geographical region associated with the providers and other providers within the geographical region.

In an embodiment, at 340, the fulfillment/analytics manager receives from the online service other portions of the order and places the order consistent with the other portions of the order with a particular provider to initiate order fulfillment processing at the particular provider.

Figure 4:
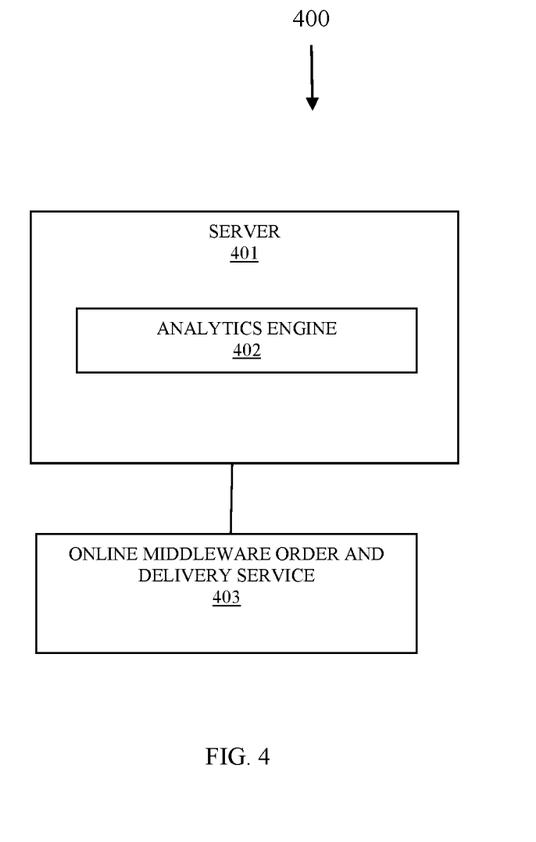
FIG. 4 is a diagram of a system for real-time integration of analytics for online services, according to an example embodiment.

FIG. 4 is a diagram of a system 400 for real-time integration of analytics for online services, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a server 401 and an analytics engine 402.

In an embodiment, the server 401 is the platform server 130. In an embodiment, the server 130 is a collection of servers that cooperate as a cloud processing environment.

The analytics engine 402 is a set of executable instructions that is executed on one or more hardware processors of the server 401 from a non-transitory computer-readable storage medium or memory.

The analytics engine 402 is configured to: i) receive order information from an online middleware order and delivery service 403 during an order process between a consumer and the online middleware order and delivery service, ii) obtain real-time ordering metrics from a plurality of providers, iii) generate at least one analytic from the real-time ordering metrics, and iv) provide the at least one analytic to the online middleware order and delivery service 403 during the order process.

In an embodiment, the system 400 further includes the online middleware order and delivery service 403. The online middleware order and delivery service 402 is configured to provide at least one recommendation to the consumer during the order process based on the at least one analytic.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor from a non-transitory computer-readable medium of a server associated with a cloud processing environment and causing the processor to perform operations comprising:
obtaining metrics from a plurality of providers using a first Application Programming Interface (API) to interact with provider servers of the providers, wherein the metrics comprise for each provider: current wait times for fulfilling new orders, size of current unfulfilled orders, items being ordered, origination source for each order, and time each order was placed within a last configured period of time;

continuously producing and updating analytics from the metrics based on provider locations for the providers and provider types for the providers, wherein producing the analytics further includes producing the analytics as current average order fulfillment times by provider, by provider type, and by provider location, and producing the analytics as item popularity for items based on the metrics associated with customer orders by provider, by provider type, and by provider location, and producing the analytics as side or related items ordered with each particular item based on the metrics by provider, by provider type, by provider location, by calendar date, and by day of week, wherein continuously producing and updating further includes performing the producing and updating before any particular orders are placed with any of the providers for integration with services associated with the particular orders;
identifying current available promotions using the API for each of the provider servers;
storing the current available promotions for each provider in a database for real-time delivery to an online service during consumer-placed orders with the online service; and
delivering and integrating the analytics within the online service by using a second API and by interacting with an order/delivery platform server for the online service and causing by the delivering and the integrating the integration of the analytics into an order process that a consumer initiated to place an order while the consumer is operating a customer-facing interface of a consumer-operated device and interacting with the online service to place the order with the online service, wherein the online service is a middleware order and delivery service that interacts with the provider servers, interacts with the method through the second API, and interacts with the consumer through the customer-facing interface associated with an order/delivery mobile application of the consumer-operated device, wherein delivering and integrating further includes providing the current available promotions to the online service, via the second API, from the database and for selection by the consumer during the order process.

2. The method of claim 1, wherein obtaining further includes obtaining the metrics in real time responsive to a particular order received from the online service during the order process.

3. The method of claim 1, wherein obtaining further includes obtaining the metrics at preconfigured intervals of time from the providers independent of the order process.

4. The method of claim 1, wherein obtaining further includes obtaining the metrics from the providers as order details are placed at each of the providers within a given period of time.

5. The method of claim 1, wherein continuously producing and updating further includes selectively grouping the metrics as one or more groupings based the order associated with the order process and calculating the analytics from the one or more groupings.

6. The method of claim 5, wherein selectively grouping further includes producing the groupings based on combinations of: a particular type of provider, a particular provider, a particular item associated with the order, a particular geographical range, item fulfillment times, and other items ordered when the particular item is ordered.

7. The method of claim 1, wherein continuously producing and updating further includes obtaining other metrics from a data store and combining the metrics with the other metrics when producing the analytics.

8. The method of claim 1, wherein delivering further includes delivering the analytics in response to the order provided by the online service.

9. The method of claim 1, wherein delivering and integrating further includes delivering the analytics in advance of the order process and in advance of any order initiated by the consumer with the online service as part of the order process.

10. The method of claim 1 further comprising, interacting and placing the order, received from the online service, with a particular provider to complete the order process.

11. A method, comprising: providing executable instructions to a processor from a non-transitory computer-readable medium of a server associated with a cloud processing environment and causing the processor to perform operations comprising:
receiving, via a first Application Programming Interface (API) at least a portion of an order from an online service of an order/delivery platform server that is engaged in an order process with a consumer through a customer-facing interface operated by the consumer using an order/delivery application of a consumer-operated device that is operated by the consumer;
obtaining, via a second API, metrics from provider servers of providers with respect to received orders and fulfilled orders for a given period of time at the providers, at provider locations for the providers, and based on the portion, wherein the metrics for the providers are calculated before the order process was initiated by the consumer and are obtained during the order process for integration with services associated with the order process;
identifying, via the second API, current available promotions from each of the provider servers;
storing the current available promotions for each provider server in a database for real-time delivery to the online service during consumer-placed orders with the online service;
generating analytics from the metrics, wherein the metrics comprise for each provider: current wait times for fulfilling new orders by provider and by provider location, size of current unfulfilled orders by provider and by provider location, items being ordered by provider and by provider location, origination source for each order by provider and by provider location, and time each order was placed within a last configured period of time by provider and by provider location; and
providing and integrating the analytics into the online service using the first API and interacting with the order/delivery platform server and causing by the providing and the integrating the integration of the analytics into the online service that generates and provides a recommendation for the order by providing the recommendation to the consumer for the consumer to complete the order with the online service through the customer-facing interface of the order/delivery application on the consumer-operated device, wherein the online service is a middleware order and delivery service that interacts with the provider servers, interacts with the method through the first API, and interacts with the consumer through the customer-facing interface associated with an order/delivery mobile application of the consumer-operated device, wherein providing and integrating further includes providing the current available promotions to the online service from the database, via the first API, for selection by the consumer during the order process.

12. The method of claim 11 further comprising, receiving from the online service other portions of the order and placing the order consistent with the other portions with a particular provider to complete the order and to initiate order fulfillment at the particular provider.

13. The method of claim 11, wherein obtaining further includes acquiring other metrics previously gathered for the providers and combining the other metrics with the metrics.

14. The method of claim 11, wherein generating further includes producing at least one analytic as current average order fulfillment times at the providers and at each provider location for the order.

15. The method of claim 11, wherein generating further includes producing at least one analytic as a list of additional items frequently ordered with a particular item associated with the portion of the order that is being ordered by the consumer through the customer-facing interface associated with the online service.

16. The method of claim 11, wherein generating further includes producing at least one analytic as a list of currently most popular ordered items that are being ordered at the providers and at the provider locations.

17. The method of claim 11, wherein generating further includes producing at least one analytic as an ordered list of most popular ordered items that are ordered across all of the providers and all of the provider locations.

18. The method of claim 11, wherein generating further includes produce at least one analytic as an ordered list of most popular ordered items that are ordered for a geographical region associated with the provider locations of the providers and other provider locations of other providers within the geographical region.

19. A system, comprising:
a server comprising at least one processor and a non-transitory computer-readable storage medium, wherein the server is part of a cloud processing environment;
the non-transitory computer-readable storage medium comprises executable instructions;
the executable instructions executed by the at least one processor from the non-transitory computer-readable storage medium causing the at least one processor to perform operations comprising:
receiving, via a first Application Programming Interface (API), order information from an online middleware order and delivery service of an order/delivery platform server during an order process between a consumer and the online middleware order and delivery service as the consumer is placing an order with the online and delivery service through a customer-facing interface of an order/delivery application with the online middleware order and delivery service while operating a consumer-operated device, wherein the consumer-operated device executes the order/delivery application;
obtaining, via a second API, real-time ordering metrics from a plurality of provider servers associated with providers, wherein the real-time ordering metrics comprise for each provider and each provider location, wherein the real-time ordering metrics for the providers are calculated before the order was initiated and are obtained during the order for integration with services associated with the order:
identifying, via the second API, current available promotions from each of the provider servers;
storing the current available promotions for each provider server in a database for real-time delivery to the online middleware order and delivery service during consumer-placed orders with the online middleware order and delivery service;
current wait times for fulfilling new orders, size of current unfulfilled orders, items being ordered, origination source for each order, and time each order was placed within a last configured period of time;
generating at least one analytic from the real-time ordering metrics per provider, per provider type, and per provider location; and
providing and integrating the at least one analytic into the online middleware order and delivery service using the first API and interacting with the order/delivery platform server during the order process and causing by the providing and the integrating the online middleware order and delivery service to provide at least one recommendation to the consumer for the order through the customer-facing interface based on the at least one analytic, wherein the online middleware order and delivery service interacts with the executable instructions through the first API, interacts with the provider servers, and interacts with the consumer through the customer-facing interface associated with an order/delivery mobile application of the consumer-operated device, wherein providing and integrating further includes providing the current available promotions to the online middleware order and delivery service from the database, via the first API, for selection by the consumer during the order process.

* * * * *